United States Patent [19]
Petersen et al.

[11] 3,899,549
[45] Aug. 12, 1975

[54] POLY(DIALKYLPHOSPHONOALKYL)CARBAMATES

[75] Inventors: Harro Petersen, Frankenthal; Friedrich Fuchs, Kirchheim; Peter Scharwaechter, Ludwigshafen, all of Germany

[73] Assignee: BASF Aktiengesellschaft, Ludwigshafen (Rhine), Germany

[22] Filed: Mar. 6, 1974

[21] Appl. No.: 448,549

[30] Foreign Application Priority Data
Mar. 10, 1973 Germany.............................. 2312090

[52] U.S. Cl.............. 260/932; 117/136; 260/927 R; 260/970

[51] Int. Cl.......................... C07f 9/40; D06c 27/00
[58] Field of Search.......................... 260/932, 927 R

[56] References Cited
UNITED STATES PATENTS

| | | | |
|---|---|---|---|
| 2,957,931 | 10/1960 | Hamilton et al. | 260/932 X |
| 2,989,562 | 6/1961 | Swern et al. | 260/932 X |
| 3,579,532 | 5/1971 | Nachbar et al. | 260/932 X |

*Primary Examiner*—Anton H. Sutto
*Attorney, Agent, or Firm*—Johnston, Keil, Thompson & Shurtleff

[57] ABSTRACT

Poly(dialkylphosphonoalkyl)carbamates as flameproofing agents for cellulosic textile materials.

1 Claim, No Drawings

POLY(DIALKYLPHOSPHONOALKYL)CARBAMATES

The present invention relates to novel substances containing in the molecule two or more dialkylphosphonoalkyl carbamate groups, to a process for their manufacture and to their use as flameproofing agents for textiles.

It is known to flameproof flammable fibrous material, particularly cellulosic material, by treating it with phosphorus-containing organic substances. Substances which are particularly well known for this purpose are tetrahydroxymethylphosphonium chloride (THPC) and tris-aziridinyl phosphine oxide (APO) used together with amino resins. Both of these substances have serious drawbacks. THPC tends to cause an unpleasant odor and APO is difficult to handle on account of its toxicity.

U.S. Pat. Nos. 3,374,292; 3,381,062; 3,381,063; 3,639,539 and 3,700,403 reveal N-monomethylol compounds and N-dimethylol compounds of dialkyl carbamoylalkanophosphonates. They are recommended in said specifications for use as flameproofing agents for cellulose. It has been found however, that finishes obtained therewith show inadequate resistance to chlorine treatments. U.K. Pat. No. 1,311,906 describes a process for providing a flame-retardant finish on cellulosic textiles, in which the nitrogenous phosphorus compound used is a monomethylol or dimethylol compound of dialkylphosphono-monoalkyl carbamates. Their wash-resistance has however, not proved satisfactory.

We have now found some novel substances which may be used as wash-resistant flameproofing agents and which contain in the molecule at least two dialkylphosphono radicals. The substances of the invention have the general formula:

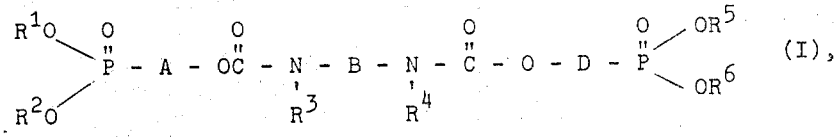

in which $R^1$, $R^2$, $R^5$ and $R^6$ denote $C_{1-4}$ alkyl optionally substituted by halogen atoms, preferably chlorine and/or bromine atoms, or $R^1$ and $R^2$ and/or $R^5$ and $R^6$ together form alkylene of 2 or 3 carbon atoms, $R^3$ and $R^4$ denote hydrogen, $C_{1-3}$ alkyl, methylol or alkoxymethyl or a radical of the formula:

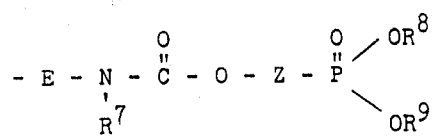

in which $R^7$ is hydrogen, $C_{1-3}$ alkyl, methylol or alkoxymethyl and $R^8$ and $R^9$ are $C_{1-4}$ alkyl optionally substituted by chlorine or bromine or together form alkylene of 2 or 3 carbon atoms, and the radicals A, B, D, E and Z are the same or different and denote alkylene of from 2 to 6 carbon atoms.

Of particular industrial significance are those substances of formula I in which $R^1$, $R^2$, $R^5$ and $R^6$ are the same alkyl radicals which may be unsubstituted or substituted by halogen atoms as mentioned above, preferably alkyl radicals of 1 or 2 carbon atoms, and also those substances in which $R^3$ and $R^4$ denote hydrogen, methylol or alkoxymethyl or those substances in which one of the radicals $R^3$ and $R^4$ denotes the radical of formula

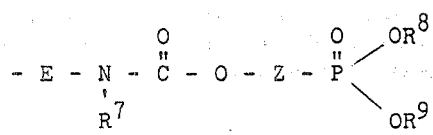

where $R^7$ is hydrogen, methylol or alkoxymethyl, and finally those substances in which A, B, D, E and Z denote unsubstituted alkylene, preferably those of from 2 to 5 carbon atoms. Of these substances, those of formula I in which the radicals A, B, D and, possibly, E and Z contain two or three carbon atoms are of particular interest.

Examples of substances of formula I are:

(a) 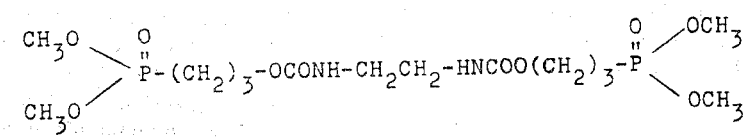

(b) 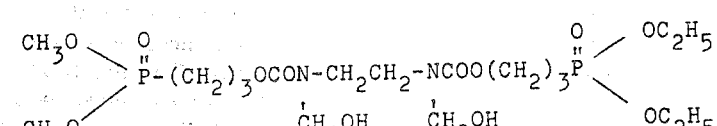

(c) 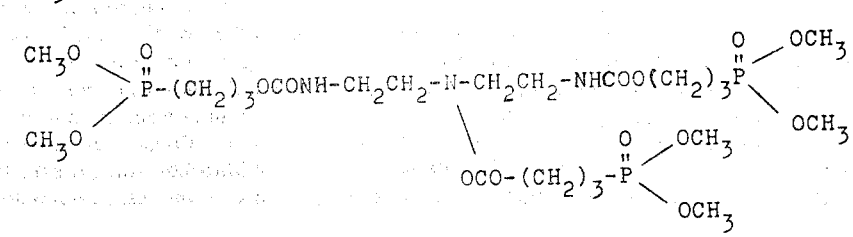

(d) 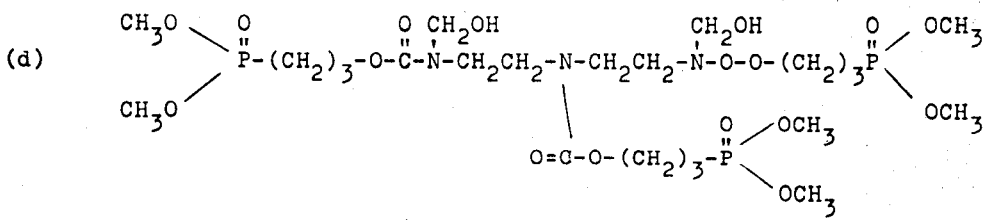

The substituents $R^1$, $R^2$, $R^5$ and $R^6$ in these compounds may, if desired, be halogenated radicals such as —$CH_2CH_2Cl$ (Br) or —$CH_2CHCl$—(Br)—$CH_2Br(Bl)$, and the radicals $R^3$ and $R^4$ may be radicals of the formulae —$CH_2OCH_3$, —$CH_2OC_2H_5$ and

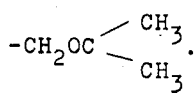

The substances of formula I may, according to the invention, be manufactured by reacting phosphorous dialkyl esters of the formula:

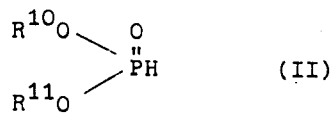 (II)

in which $R^{10}$ and $R^{11}$ are $C_{1-4}$ alkyl radicals, optionally substituted by halogen atoms, or together form alkylene of 2 or 3 carbon atoms, with carbamates of the formula:

(III)

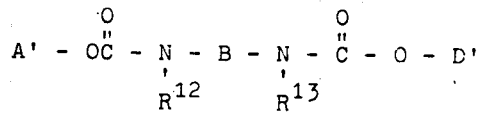

in which A' and D' are alkenyl of from 2 to 6 carbon atoms and $R^{12}$ and $R^{13}$ denote hydrogen, alkyl or a radical of the formula:

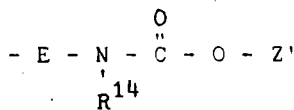

where Z' is $C_{2-6}$ alkenyl, B and E have the meanings stated above and $R^{14}$ denotes hydrogen or alkyl, in the presence of an organic peroxide as catalyst, the product thus formed being optionally methylolated with formaldehyde and then optionally acetalized at the thus introduced methylol group(s) with a $C_{1-3}$ alkanol.

It has proved successful, when operating this process, to use the substance of formula II in excess, for example an excess of from 1.5 to 5 times the molar amount, based on each double bond in the starting material III. This is an effective way of suppressing side reactions and improving the yields.

Suitable catalysts are any organic peroxides, particularly those having a decomposition range of from 50° to 220°C and preferably from 80° to 180°C, for example di-t-butyl peroxide and dibenzoyl peroxide.

The catalyst is advantageously used in an amount of from 0.1 to 10% by weight of the reaction mixture.

The starting materials II and III are generally reacted by simply mixing them together with the catalyst and heating the mixture. The temperature at which the reaction is carried out depends on the type of peroxide used and may be readily determined by simple experiment. The reaction is usually complete within 30 to 90 minutes. If desired, the reaction may be carried out in the presence of inert solvents. The resulting product may, if desired, be reacted in known manner in alkaline medium with formaldehyde to form the corresponding methylol compound. This may be acetalized, also in known manner, with a $C_{1-3}$ alkanol in the presence of an acid catalyst. Specifically, the optional steps of methylolation and acetalization may be carried out, for example, as follows.

Methylolation may be effected by mixing the substance obtained by reacting components II and III with an aqueous solution of formaldehyde in an appropriate molar ratio. To the mixture there is added an alkaline material, for example an alkali metal hydroxide, to give a pH of from 8 to 11, preferably from 9 to 10. On completion of the exothermic reaction, the resulting aqueous solution of the methylol compound is neutralized.

Acetalization may be successfully carried out by isolating the methylol compound from its aqueous solution by evaporation and then dissolving it in the alkanol selected for the acetalization, whereupon the solution is mixed with a catalytic amount of an acid, preferably a strong acid, and is heated until the acetalization reaction is complete, after which it is neutralized. The excess alkanol may then be removed by distillation.

The substances of formula I may be very successfully used as flameproofing agents for textile materials, primarily textile materials containing or consisting of natural or regenerated cellulose. To render the finish durable to laundering it has been found advantageous to add to the finishing liquor a substance capable of forming an amino plastic. Examples of suitable substances of this kind are all methylol and alkoxymethyl compounds of acrylic and cyclic ureas, e.g. of urea, thiourea, ethylene urea, propylene urea, glyoxal monoimidazolid-2-one, triazinones and urones, of mono- and di-carbamates, cyanamide and dicyanamide and amino triazines, particularly the methylol and methoxymethyl compounds of melamine. In the case of compounds of formula I in which some or all of the radicals $R^3$, $R^4$ and $R^7$ denote methylol or alkoxymethyl groups, a reaction is obtained with the hydroxyl groups of the cellulose, in known manner, but the combined use of aminoplastic forming substances improves the durability to laundering of the flameproof finish in these cases also.

In use, the textile materials to be treated are impregnated with one or more substances of formula I and, optionally, with one or more aminoplastic-forming substances and are then reacted in the presence of at least one acid and/or potentially acid catalyst. Preferably, the substances of formula I and, optionally, the aminoplastic-forming substances are used in the form of aqueous impregnating baths. The concentration of substances of formula I in said baths is generally from 250 to 600 g/l. The amount of aminoplastic-forming substance which may have to be added is generally from 50 to 250 g/l. The substances of formula I are preferably applied to the textile material at a rate of from 12 to 25% and preferably from 15 to 20% by weight. If they are applied at a lower rate, the effect achieved is inadequate and higher rates of application are detrimental to the handle and tensile strength.

Impregnation is preferably carried out on a padding machine. The impregnated material is freed from excess liquor in known manner by squeezing. The wet pickup is adjusted to the desired rate of application by varying the concentration of the liquor. The impregnated textile material may then be dried and heated to a temperature of about 200°C and preferably to from 130° to 170°C, in the presence of an acid or potentially acid catalyst. This reaction is generally complete in from 1 to 6 minutes under these conditions.

The acidic or potentially acidic catalysts are well known and commonly used for the purpose of finishing with N-alkoxymethyl compounds. Examples of suitable catalysts are organic and inorganic acids, for example sulfuric acid, hydrochloric acid, phosphoric acid, boric acid, oxalic acid and salts giving an acid reaction or forming acids in use, for example as a result of heating and/or hydrolysis, e.g. ammonium salts and amine salts, magnesium chloride, zinc chloride and zinc nitrate. Particularly good flameproofing effects are achieved by using mono- and diammonium phosphates. The reaction of the substances of formula I, with or without aminoplastic-forming substances, with the textile material is carried out, as mentioned above, in the presence of the catalysts. This may be achieved by applying the catalysts, preferably in the form of aqueous solution, to the textile material, before or after the latter has been impregnated with the novel substances of the invention. Preferably however, the catalysts are added directly to the impregnating bath containing the substance of formula I. In general, catalyst concentrations of from 1 to 40 g/l have proved to be successful for effecting the said finish.

The substances of formula I and, optionally, the aminoplastic-forming substances may also be used together with other finishing agents such as nitrogen-free hydroxymethyl or alkoxymethyl compounds, polyethylene glycol formals and epoxy group-containing compounds such as glycol diglycidol ether. It is also possible to include conventional water-repellent, softening, levelling, wetting and other finishes. Examples of water repellents are the well-known aluminum-containing or zirconium-containing paraffin wax emulsions and silicone-containing compositions and perfluorinated aliphatic compounds. Examples of softeners are ethoxylation products of high molecular weight fatty acids, fatty alcohols or fatty acid amides, high molecular weight polyglycol ethers and their esters, high molecular weight fatty acids, fatty alcohol sulfonates, stearyl N,N-ethylene urea and stearyl amidomethylpyridinium chloride. Examples of levelling agents are water-soluble salts of acid esters of polybasic acids with ethylene oxide adducts or propylene oxide adducts of long-chain alkoxylatable substances. As wetting agents there may be mentioned, for example, salts of alkyl-naphthalene-sulfonic acids, the alkali metal salts of sulfonated dioctyl succinate and the adducts of alkylene oxides and fatty alcohols, alkyl phenols, fatty amines and the like. Examples of suitable finishing agents are cellulose ethers, cellulose esters and alginates and also solutions or dispersions of synthetic polymers such as polyethylene, polyamides, ethoxylated polyamides, polyvinyl ethers, polyvinyl alcohols, polyacrylic acid or their esters and amides and the corresponding polymethacrylic compounds, polyvinyl propionate, polyvinyl pyrrolidone, copolymers, e.g. those of acrylates or methacrylates and at least 20% by weight of acrylic and/or methacrylic acid, vinyl chloride and acrylates, butadiene and styrene or acrylonitrile or α-dichloroethylene, β-chloroalkyl acrylates or vinyl β-ethyl ether and acrylamide or the amides of crotonic acid or maleic acid and also N-methylol methacrylamide and other polymerizable compounds.

Following the reaction with the substances of formula I and, optionally, the aminoplastic-forming substances, the textile materials have excellent flame-retardant properties which are very resistant to hydrolysis and laundering. The treated material may be washed, rinsed and dried in the usual manner.

In the following Examples the parts and percentages are by weight unless otherwise stated. The parts by weight relate to the parts by volume as do kilograms to liters.

EXAMPLE 1

To 220 parts of dimethyl phosphite there are added, dropwise and simultaneously, 228 parts of N,N'-ethylene-bis-(allylcarbamate), dissolved in 220 parts of dimethyl phosphite, and 20 parts of di-t-butyl peroxide, in a stirred vessel at 150°–160°C. The reaction mixture is evaporated in vacuo together with a further 5 parts of di-t-butyl peroxide. There are obtained 420 parts (94% of theory) of N,N'-ethylene-bis-(3-dimethylphosphonopropyl-carbamate) of the formula

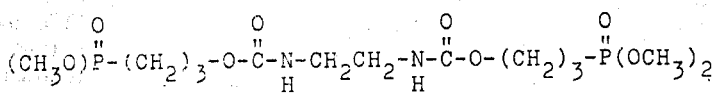

Analysis results:
found:           C 37.1      H 6.9      N 5.8      P 14.0%

$C_{14}H_{30}N_2O_{10}P_2$ (448)
requires:          37.4       6.7        6.2        13.8%.

448 parts of N,N'-ethylene-bis-(3-dimethylphosphonopropylcarbamate) are mixed with 150 parts of a 40% aqueous formaldehyde solution and are adjusted to pH 8.1 with 20 parts of 5N caustic soda solution. The temperature rises to 50°C. The mixture is allowed to react at this temperature for 1 hour, the pH being maintained at 8.0 by further additions of 5N caustic soda. The mixture is then cooled and neutralized with dilute phosphoric acid. There are obtained 622 parts of a clear liquid reaction product having a solids content of 78%.

Cotton twill weighing about 170 g/m² is impregnated in an aqueous liquor containing 500 parts of the compound of the formula

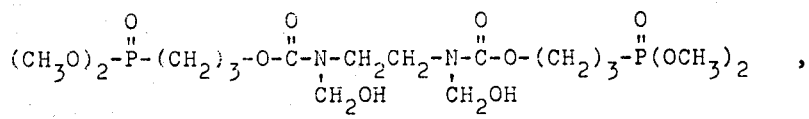

160 parts of hexamethylolmelamine pentamethyl ether and 40 parts of 45% phosphoric acid per liter. The fabric is padded to give a wet pickup of 50%, dried at 100°C and condensed for 6 minutes at 180°C. Unreacted products are removed by washing the fabric for 2 minutes with 2 parts of soda per liter of water at 70°C. The fabric is rinsed with water having a temperature of 70°C and is then dried.

In the vertical burning test as laid down by German Standard DIN 53,906, the cotton twill thus treated shows excellent nonflammable properties which remain after 5 boils at 95°C:

| DIN 53,906 | untreated fabric | after application | treated fabric after 5 boils* |
|---|---|---|---|
| testing period (sec) | 6 | 6 | 6 |
| burning time (sec) | 21 | 0 | 0 |
| glow time (sec) | 65 | 0 | 0 |
| length of tear (mm) | completely burnt | 62 | 51 |
| load (g) |  | 50 | 50 |

*95°C, 1.5 g/l of a commercial detergent.

EXAMPLE 2

To 220 parts of dimethyl phosphite there are added, dropwise in a stirred vessel at 150°–160°C, 355 parts of the compound of the formula:

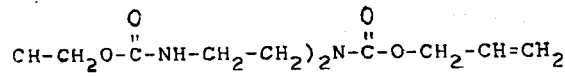

dissolved in 330 parts of dimethyl phosphite, and 30 parts of di-t-butyl peroxide. The reaction mixture is mixed with a further 5 parts of di-t-butyl peroxide, stirred for 30 minutes at 160°C and evaporated in vacuo. There are obtained 660 parts (96% of theory) of the viscous reaction product of the formula

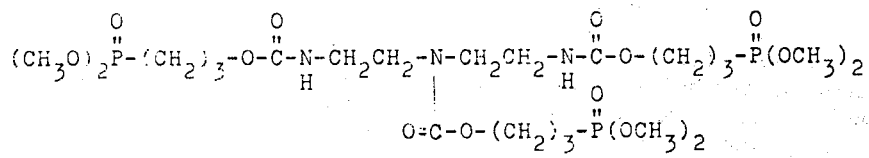

Analysis results:
found:                        C 37.9    H 6.9    N 6.1    P 12.8
$C_{22}H_{46}N_3O_{15}P_3$    38.5      6.5      6.1      13.2
(685) requires 685 parts of the product thus obtained are mixed with 150 parts of 40% aqueous formaldehyde and adjusted to a pH of 8.1 with 21 parts of 5N caustic soda solution. The temperature rises to 55°C. The mixture is allowed to react for 1 hour at this temperature and the pH is maintained at 8.0 by the addition of 5N caustic soda. The mixture is then cooled and neutralized with dilute phosphoric acid to give 919 parts of a clear liquid reaction product having a solids content of 79%.

Cotton twill weighing about 170 g/m² is impregnated with an aqueous liquor containing 500 parts of the compound of the formula

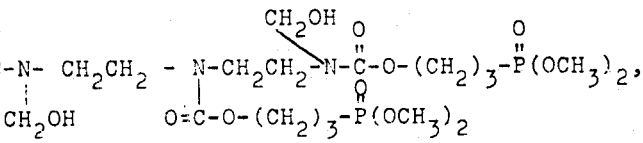

160 parts of hexamethylolmelamine pentamethyl ether and 40 parts of 45% phosphoric acid per liter. The fabric is squeezed to give a wet pickup of 50%, is dried at 100°C and is condensed for 6 minutes at 180°C. Unreacted products are removed by washing the fabric for 2 minutes with 2 parts of soda per liter of water at 70°C. The fabric is rinsed with water heated at 70°C and is then dried. In the vertical burning test, the cotton twill thus treated shows excellent flame-retardant properties as measured by DIN 53,906, these properties remaining after 50 boils at 95°C.

| DIN 53,906 | untreated fabric | treated fabric after | | |
|---|---|---|---|---|
| | | application | 30 boils⁺ | 50 boils⁺ |
| test period (sec) | 6 | 6 | 6 | 6 |
| burning time (sec) | 21 | 0 | 0 | 0–1 |
| glow time (sec) | 65 | 0 | 0 | 0 |
| length of tear (mm) | completely | 60 | 75 | 85 |
| load (g) | burnt | 50 | 50 | 50 |

⁺95°C; 1.5 g/l of a commercial detergent.

We claim:
1. Substances of the formula

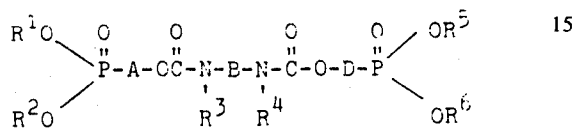

in which $R^1$, $R^2$, $R^5$ and $R^6$ denote $C_{1-4}$ alkyl optionally substituted by halogen atoms, $R^3$ and $R^4$ denote hydrogen, $C_{1-3}$ alkyl, methylol or $C_{1-3}$ alkoxymethyl or a radical of the formula:

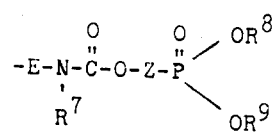

in which $R^7$ is hydrogen, $C_{1-3}$ alkyl, a methylol or $C_{1-3}$ alkoxymethyl group and $R^8$ and $R^9$ are $C_{1-4}$ alkyl optionally substituted by halogen atoms or together form alkylene of 2 to 3 carbon atoms, and the radicals A, B, D, E and Z are the same or different and denote alkylene radicals of from 2 to 6 carbon atoms.

* * * * *